US011433373B2

(12) United States Patent
Wang et al.

(10) Patent No.: US 11,433,373 B2
(45) Date of Patent: Sep. 6, 2022

(54) METHODS OF MAKING ZEOLITE-TEMPLATED CARBON PELLETS AND USES THEREOF

(71) Applicants: Saudi Arabian Oil Company, Dhahran (SA); Korea Advanced Institute of Science and Technology, Daejeon (KR)

(72) Inventors: Yuguo Wang, Dhahran (SA); Rashid M. Othman, Dhahran (SA); Minkee Choi, Daejeon (KR); Seokin Choi, Daejeon (KR)

(73) Assignees: SAUDI ARABIAN OIL COMPANY; KOREA ADVANCED INSTITUTE OF SCIENCE AND TECHNOLOGY

( * ) Notice: Subject to any disclaimer, the term of this patent is extended or adjusted under 35 U.S.C. 154(b) by 316 days.

(21) Appl. No.: 16/700,571

(22) Filed: Dec. 2, 2019

(65) Prior Publication Data
US 2020/0290016 A1  Sep. 17, 2020

Related U.S. Application Data

(60) Provisional application No. 62/816,696, filed on Mar. 11, 2019.

(51) Int. Cl.
*B01D 53/02* (2006.01)
*B01J 20/30* (2006.01)
(Continued)

(52) U.S. Cl.
CPC .......... *B01J 20/3042* (2013.01); *B01D 53/02* (2013.01); *B01J 20/183* (2013.01);
(Continued)

(58) Field of Classification Search
CPC ........ B01D 2253/102; B01D 2253/108; B01D 2257/7025; B01D 53/02; B01J 20/183;
(Continued)

(56) References Cited

U.S. PATENT DOCUMENTS 3,247,099 A * 4/1966 Oleck .................... B01J 29/123
208/2
3,269,934 A * 8/1966 Hansford ............... C10G 47/18
208/2

(Continued)

OTHER PUBLICATIONS

Guan, C. et al., "Methane storage in a template-synthesized carbon", Separation and Purification Technology, Elsevier Science, Amsterdam, NL, vol. 64, No. 1, Nov. 20, 2008 (Nov. 20, 2008) pp. 124-126.

(Continued)

*Primary Examiner* — Christopher P Jones
(74) *Attorney, Agent, or Firm* — Bracewell LLP; Constance Gall Rhebergen (57) ABSTRACT

Provided here are adsorbent compositions containing polyvinyl alcohol-bonded pellets of zeolite templated carbon. Also provided here are methods of producing adsorbent compositions by forming an aqueous mixture containing a binder, water, and zeolite-templated carbon; subjecting the aqueous mixture to a drying process to remove the water and form a dry mixture of the binder and the zeolite-templated carbon, and compacting the dry mixture of the binder and the zeolite-templated carbon to form the binder-bonded pellets of the zeolite templated carbon.

9 Claims, 4 Drawing Sheets (51) Int. Cl.
*B01J 20/18* (2006.01)
*B01J 20/28* (2006.01)

(52) U.S. Cl.
CPC ....... *B01J 20/2803* (2013.01); *B01J 20/3035* (2013.01); *B01D 2253/102* (2013.01); *B01D 2253/108* (2013.01); *B01D 2257/7025* (2013.01); *B01J 2219/00049* (2013.01)

(58) Field of Classification Search
CPC .. B01J 20/20; B01J 20/28011; B01J 20/2803; B01J 20/28066; B01J 20/3035; B01J 20/3042; B01J 2219/00049; Y02C 20/20
See application file for complete search history.

(56) References Cited

U.S. PATENT DOCUMENTS

| | | | | |
|---|---|---|---|---|
| 3,393,156 | A * | 7/1968 | Hansford | B01J 20/183 502/66 |
| 3,437,586 | A * | 4/1969 | Weisz | C10G 47/16 585/419 |
| 4,131,566 | A * | 12/1978 | Murty | C01B 32/384 502/425 |
| 4,220,553 | A * | 9/1980 | Krause | B01J 20/2803 96/135 |
| 4,250,059 | A * | 2/1981 | Tu | B01J 27/18 502/64 |
| 4,266,408 | A * | 5/1981 | Krause | F25B 43/003 62/85 |
| 4,999,330 | A | 3/1991 | Bose et al. | |
| 9,562,649 | B2 | 2/2017 | Wang et al. | |
| 10,302,254 | B2 | 5/2019 | Wang et al. | |
| 2005/0245393 | A1 * | 11/2005 | Herfert | C08K 3/346 502/402 |
| 2009/0005600 | A1 * | 1/2009 | Bosch | B01J 29/06 502/158 |
| 2011/0105301 | A1 * | 5/2011 | Wang | B01J 20/186 502/79 |
| 2013/0220974 | A1 * | 8/2013 | Yushin | H01G 11/26 216/56 |
| 2014/0113811 | A1 * | 4/2014 | Stadie | B01J 20/00 423/292 |
| 2015/0283534 | A1 * | 10/2015 | Costantino | B01J 20/28016 585/16 |
| 2016/0101407 | A1 | 4/2016 | Wang et al. | |
| 2017/0043318 | A1 * | 2/2017 | Miller | B01J 20/18 |

OTHER PUBLICATIONS

International Search Report and Written Opinion for related PCT application PCT/US2020/022108 dated May 27, 2020.

Guan et al., "Methane storage in a template-synthesized carbon," Separation and Purification Technology, 64, 124-126, 2008.

Lozano-Castello et al., "Advances in the study of methane storage in porous carbonaceous materials," Fuel, 81, pp. 1777-1803, 2002.

Lozano-Castello et al., "Activated carbon monoliths for methane storage: influence of binder," Carbon, 40, pp. 2817-2825, 2002.

Stadie et al., "Anomalous Isosteric Enthalpy of Adsorption of Methane on Zeolite Templated Carbon Supporting Information," Journal of the American Chemical Society, pp. s1-s28, 2013.

Stadie et al.,"Zeolite-Templated Carbon Materials for High-Pressure Hydrogen Storage," Langmuir, American Chemical Society, 28, pp. 10057-10063, 2012.

U.S. Appl. No. 16/678,638, "Systems and Methods of Use of Carbon-Based Pellets in Adsorbed Natural Gas Facility", filed Nov. 8, 2019.

U.S. Appl. No. 16/591,907, "Mobile Natural Gas Storage and Transportation Unit Based on Adsorption", filed Oct. 3, 2019.

* cited by examiner

METHODS OF MAKING ZEOLITE-TEMPLATED CARBON PELLETS AND USES THEREOF

PRIORITY

The present application is a non-provisional application of and claims priority to and the benefit of U.S. Prov. App. Ser. No. 62/816,696, filed Mar. 11, 2019, the entire disclosure of which is incorporated here by reference.

TECHNICAL FIELD

The disclosure relates to methods and systems for making and using zeolite-templated carbon pellets for storage of natural gas.

BACKGROUND

Adsorbed natural gas technology uses a porous adsorbent material to store natural gas at pressures less than 650 pound per square inch (psi) as compared to compressed natural gas technology where gas is stored at 3000 psi or greater pressures. Activated carbons are commonly used adsorbents in adsorbed natural gas storage (ANG) applications. But, they have significant limitations. Activated carbons are produced by chemically burning out nonporous carbon precursors in a controlled manner. Activated carbons with mesopores and macropores have low packing densities of 0.2 to 0.6 grams per cubic centimeter ($gcm^{-3}$). Mesopores in adsorbents for ANG applications generally have a pore diameter greater than 2 nanometers (nm) and less than 50 nm, while macropores in these adsorbents have a pore diameter greater than 50 nm. Micropores in adsorbents for ANG applications have a pore diameter generally less than 2 nm. Activated carbons with mainly micropores exhibit slow adsorption/desorption kinetic behavior due to the slow mass transport. The slow mass transport can be attributed to the presence of micropores with narrow pore diameters and dead-end pore connectivity. Rational and systematic design of carbon pore structure in the activated carbons has not possible due to the mechanistic reasons.

SUMMARY

To overcome the aforementioned problems of conventional activated carbon adsorbents, compositions and methods of synthesis of microporous carbon compositions were developed. Disclosed here are methods of producing carbon-based adsorbent compositions. One such method includes the steps of forming an aqueous mixture containing a binder, water, and a zeolite-templated carbon; subjecting the aqueous mixture to a drying process to remove the water and form a dry mixture of the binder and the zeolite-templated carbon, and compacting the dry mixture of the binder and the zeolite-templated carbon to form an adsorbent composition. In an embodiment, the adsorbent composition is a binder-bonded pellet of the zeolite-templated carbon.

In certain embodiments, the step of subjecting the aqueous mixture to a drying process is performed at a temperature of 373 Kelvin (K) or alternatively at a temperature greater than 373 K but less than 393 K. In certain embodiments, the step of compacting the dry mixture of the binder and the zeolite-templated carbon is performed at a pressure ranging from 100 to 350 megapascals (MPa). The step of compacting the dry mixture of the binder and the zeolite-templated carbon can be performed at a pressure of 150 MPa. The step of compacting the dry mixture of the binder and the zeolite-templated carbon can be performed at a pressure of 300 MPa. In certain embodiments, the step of compacting the dry mixture of the binder and the zeolite-templated carbon is performed at a temperature ranging from 400 to 550 K. In certain embodiments, the step of compacting the dry mixture of the binder and the zeolite-templated carbon is performed at a temperature ranging from 423 to 523 K. The step of compacting the dry mixture of the binder and the zeolite-templated carbon can be performed at a temperature of 473 K.

In certain embodiments, the binder used in production of the zeolite-templated carbon adsorbent compositions is present at 5 weight percent of the aqueous mixture and the zeolite-templated carbon is present at 10 weight percent of the aqueous mixture. The binder can be polyvinyl alcohol. In certain embodiments, the polyvinyl alcohol has a molecular weight ranging from 85,000 to 124,000 grams per mole (g/mol) and is 99% hydrolyzed.

Disclosed here are adsorbent compositions containing a polyvinyl alcohol-bonded pellet of a zeolite templated carbon and having a pellet density greater than 0.6 $gcm^{-3}$ and mechanical compressive strength greater than 10 MPa. In certain embodiments, the pellet density is greater than 0.8 $gcm^{-3}$. In certain embodiments, the mechanical compressive strength is greater than 30 MPa.

Disclosed here are methods of storing a gas using an adsorbent composition containing binder-bonded pellet of the zeolite-templated carbon. One such method includes the steps of providing, in a closed chamber, an adsorbent composition containing a polyvinyl alcohol-bonded pellet of a zeolite templated carbon. A gas is introduced under pressure greater than ambient pressure to the closed chamber and the gas is maintained in the closed chamber under loading conditions until volume of the gas adsorbed is 110 times greater than volume of gas adsorbed at ambient pressure. In certain embodiments, the gas is maintained in the closed chamber under loading conditions until volume of the gas adsorbed is 120 times greater than volume of gas adsorbed at ambient pressure. In certain embodiments, the gas is maintained in a closed chamber under loading conditions until volume of the gas adsorbed is 130 times greater than volume of gas adsorbed at ambient pressure. Examples of gases that can be stored using these adsorbent compositions are hydrogen, nitrogen, carbon dioxide, methane, propane, natural gas, or other gaseous fuels. In certain embodiments, the adsorbent composition used in storing one or more of these gases contains a polyvinyl alcohol-bonded pellet of the zeolite templated carbon with a pellet density greater than 0.6 $gcm^{-3}$ and mechanical compressive strength greater than 10 MPa.

Numerous other aspects, features and benefits of the present disclosure may be made apparent from the following detailed description taken together with the drawings. The methods and compositions can include other steps or different components depending on desired goals.

BRIEF DESCRIPTION OF THE DRAWINGS

Embodiments will be readily understood by the following detailed description in conjunction with the accompanying drawings. Embodiments are illustrated by way of example and not by way of limitation in the accompanying drawings, as the disclosure may include other effective embodiments as well.

DETAILED DESCRIPTION

The disclosure describes various pelletized zeolite-templated carbon compositions and methods of preparation of these compositions for storing gases for ANG applications. In the following description, numerous details are set forth in order to provide a thorough understanding of the various embodiments. In other instances, well-known processes, devices, and systems may not be described in particular detail in order to not obscure unnecessarily the various embodiments. Additionally, illustrations of the various embodiments may omit certain features or details in order to not obscure the various embodiments.

In the following detailed description, reference is made to the accompanying drawings that form a part of this disclosure. The drawings provide an illustration of some of the various embodiments in which the subject matter of the present disclosure may be practiced. Other embodiments may be utilized and logical changes may be made without departing from the scope of this disclosure. The description may use the phrases "in certain embodiments," "in various embodiments," "in an embodiment," or "in embodiments," which may each refer to one or more of the same or different embodiments. Furthermore, the terms "comprising," "including," "having," and the like, as used with respect to embodiments of the present disclosure, are synonymous. The term "pellet" is used to describe a binder-bonded body of zeolite-templated carbon composition and is not intended to limit the size or shape of such bodies.

Disclosed here are adsorbent compositions containing binder-bonded pellets of zeolite-templated carbon. Adsorbent compositions containing a polyvinyl alcohol-bonded pellet of zeolite-templated carbon are also disclosed here. In some embodiments, these polyvinyl alcohol-bonded pellets of zeolite-templated carbon have a pellet density greater than 0.6 gcm$^{-3}$ and mechanical compressive strength greater than 10 MPa. Certain embodiments of the adsorbent compositions have a pellet density greater than 0.8 gcm$^{-3}$. Certain embodiments of these adsorbent compositions have a mechanical compressive strength greater than 30 MPa.

Figure 3:
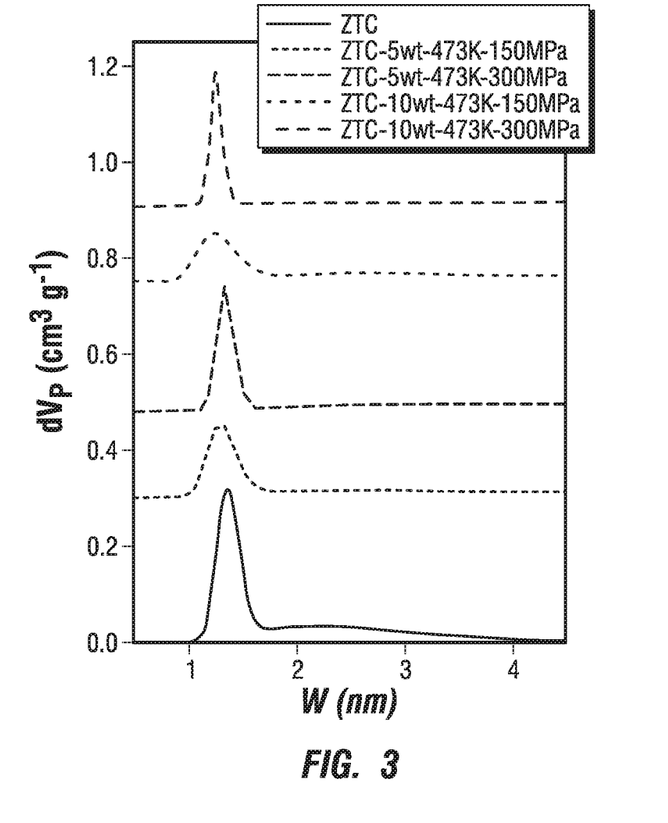
FIG. 3 is a graphical representation of pore size distribution of zeolite-templated carbon compositions that were prepared at different PVA loading concentrations and pelletizing pressures, as compared to the ZTC powder, according to an embodiment.

Embodiments include methods of producing pellets of zeolite-templated carbon compositions. In an embodiment, microporous zeolite is used as a sacrificial template and organic molecules such as propylene are carbonized inside the zeolite micropores. After carbon deposition, zeolite framework is removed by acid dissolution to generate a microporous carbon replica. In certain embodiments, the ZTC materials do not undergo any processing before being subject to pelletization. The ZTC materials are directly mixed with the binder to start the pelleting process, after the acid dissolution step. The ZTC materials exhibit a surface area up to 3000 square meters per gram (m$^2$g$^{-1}$). Due to the ordered and well-defined microporous structure, micropore size distribution is narrow as shown in FIG. 3. Pore size and pore connectivity can be tailored by choosing the zeolite templates with different structures and/or by changing chemical vapor deposition (CVD) conditions. Good three-dimensional pore connectivity can lead to enhanced mass transport at the same pore diameter. In addition to the pore structure, particle morphology of pelletized zeolite-templated carbon compositions can be controlled, because the zeolite crystal morphology is faithfully transcribed to the carbon morphology. The pelletized ZTC compositions can be synthesized in various morphologies and sizes, depending on the synthesis conditions. Uniform particle size of carbon materials induces the close packing of carbon particles. Therefore, pelletized ZTC compositions have tight packing density. If compacted zeolite pellets are used as templates to prepare the pelletized zeolite templated carbons, the pore morphology and dimensions cannot be maintained during acid etching step to remove the zeolite framework.

In certain embodiments, binder-bonded ZTC pellets are used as an industrial adsorbent in packed-bed adsorption applications. Compositions with greater than 10 MPa of mechanical strength are desired in various applications. During certain pelletization procedures described in the art, the binder tends to intrude into the micropores of porous materials. This intrusion leads to loss of micropore volume and volumetric gas adsorption capacity (expressed as volume/volume %, or v/v). Disclosed here are methods of producing pellet forms of ZTC compositions with enhanced volumetric gas adsorption capacity. These ZTC adsorbents have been pelletized in the presence of an appropriate binder.

Disclosed here are methods of producing an adsorbent composition containing pelletized ZTC compositions. One such method includes the steps of forming an aqueous mixture containing a binder, water, and zeolite-templated carbon, and subjecting the aqueous mixture to a drying process to remove the water and form a dry mixture of the binder and the zeolite-templated carbon. The method further includes compacting the dry mixture of the binder and the zeolite-templated carbon to form an adsorbent composition. The adsorbent composition is a binder-bonded pellet of the zeolite templated carbon. In certain embodiments, the binder is present at 5 weight percent (wt. %) of the aqueous mixture and the zeolite-templated carbon is present at 10 wt. % of the aqueous mixture. The step of subjecting the aqueous mixture to a drying process can be performed at 373 K, or alternatively at a temperature greater than 373 K but less than 393 K. The step of compacting the dry mixture of the binder and the zeolite-templated carbon can be performed at different combinations of pressure and temperature. In certain embodiments, the step of compacting the dry mixture of the binder and the zeolite-templated carbon is performed at a pressure ranging from 100 to 350 MPa and at a temperature ranging from 400 to 550 K. In an embodiment, the step of compacting the dry mixture of the binder and the zeolite-templated carbon can be performed at a pressure of 150 MPa, or alternatively 300 MPa. In an embodiment, the step of compacting the dry mixture of the binder and the zeolite-templated carbon can be performed at a temperature ranging from 423 to 523 K, or alternatively at a temperature of 473 K.

In certain embodiments, the binder used to produce the pelletized ZTC compositions comprises, consists of, or consists essentially of polyvinyl alcohol. Other possible binders include a proprietary binder available from Calgon Carbon Corporation (headquartered in Pittsburgh, Pa., USA), adhesive cellulose-based binders, novolac phenolic resins (such as Georgia-Pacific 5506®, available from Georgia-Pacific Chemicals, headquartered in Atlanta, Ga.) or polytetrafluoroethylene resins (such as Teflon®, available from The Chemours Company, headquartered in Wilmington, Del., USA). In other embodiments, bentonite clay and cellulose fibers can function as binders in the pelletized ZTC compositions.

Several embodiments of the pelletization methods utilize polyvinyl alcohol (PVA) as the binder. PVA was selected as one of the operative binders, because of the suitable melting point for hot-pressing conditions (less than 200 degrees Celsius (° C.)), its adhesive properties, and tensile strength. PVA is a water-soluble atactic polymer with chemical formula: $[CH_2CH(OH)]_n$. In terms of microstructure, it is composed mainly of 1,3-diol linkages [—$CH_2$—$CH(OH)$—$CH_2$—$CH(OH)$—] but a few percent of 1,2-diols [—$CH_2$—$CH(OH)$—$CH(OH)$—$CH_2$—] occur, depending on the conditions for the polymerization of the vinyl ester precursor. PVA has a melting point of 230° C. and 180-190° C. for the fully hydrolyzed and partially hydrolyzed grades, respectively. It decomposes rapidly at temperatures greater than 200° C. due to pyrolysis. PVA is close to incompressible with a Poisson's ratio between 0.42 and 0.48. An example of a PVA formulation for use here is polyvinyl alcohol from Sigma-Aldrich (operating as MilliporeSigma, headquartered in St. Louis, Miss., USA), which has a molecular weight distribution of 85,000-124,000 g/mol and is 99% hydrolyzed.

In an embodiment of a method of producing the pelletized ZTC adsorbent compositions, PVA was first dissolved in distilled water. Water and PVA were mixed at a mass ratio of $H_2O$:PVA at 20:1. This aqueous solution of PVA was mixed with pre-weighed ZTC to form a viscous slurry. In an embodiment, the PVA solution and ZTC components were added to achieve a PVA concentration of 5 wt % and a ZTC concentration of 10 wt % of the ZTC slurry. In other embodiments, the PVA solution was added to the pre-weighed ZTC to result in a ZTC slurry containing PVA at a concentration ranging from 5 wt % to 10 wt %. Further increases in the concentration of PVA may create blockage of micropores of the ZTC component and may decrease the surface area and gas adsorption capacity of the pelletized ZTC compositions.

The ZTC slurry was subjected to removal of water by evaporation or other drying methods, and the resultant PVA/ZTC mixture was pressed under heat and pressure. In an embodiment, the ZTC slurry was subjected to drying under vacuum conditions inside an oven at a temperature of 373-393 K. The water content of the dry mixture of the PVA/ZTC mixture is less than 0.1 wt %.

Examples of the operating conditions of the pelletizing process include temperatures ranging from 400 K to 550 K and pressures ranging from 100 to 350 MPa. At temperatures and pressures lesser than 400 K and 100 MPA, the density of pellets was not at desired levels for ANG applications. At temperatures and pressures greater than 550 K and 350 MPA, pelletized ZTC compositions appear to suffer from substantial sacrifice of carbon porosity. Table 3 presents an example of temperature and pressure conditions decreasing micropore volume and BET (Brunauer, Emmett and Teller) surface area without corresponding increase in pellet density of the pelletized ZTC compositions.

An example of the operating conditions for pelletization of the zeolite-templated carbon compositions includes subjecting the PVA/ZTC powder to 150 MPa of pressure and a heating rate of 10 Kelvin per minute (K/min) to reach 473 K for 30 minutes. Another example of the operating conditions includes subjecting the PVA/ZTC powder to 300 MPa of pressure and a heating rate of 10 K/min to reach 473 K for 30 minutes. Another example of the operating conditions includes subjecting the PVA/ZTC powder to 150 MPa of pressure and a heating rate of 10 K/min to reach 423 K for 30 minutes. Another example of the operating conditions includes subjecting the PVA/ZTC powder to 300 MPa of pressure and a heating rate of 10 K/min to reach 423 K for 30 minutes. An example of the operating conditions includes subjecting the PVA/ZTC powder to 150 MPa of pressure and a heating rate of 10 K/min to reach 523 K for 30 minutes. Another example of the operating conditions includes subjecting the PVA/ZTC powder to 300 MPa of pressure and a heating rate of 10 K/min to reach 523 K for 30 minutes.

Figure 1:
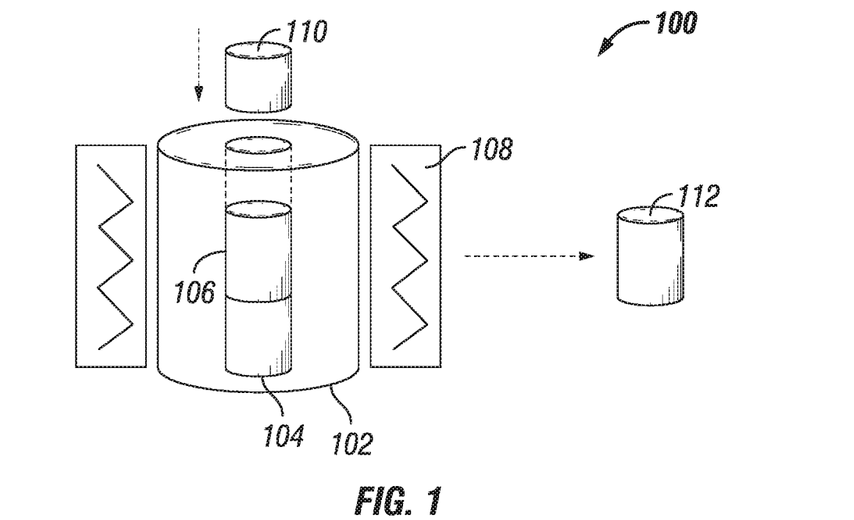
FIG. 1 is a diagrammatic representation of a system to produce the pelletized zeolite-templated carbon compositions, according to an embodiment.

FIG. 1 is a diagrammatic representation of a system 100 to produce the pelletized zeolite-templated carbon compositions, according to an embodiment. The system 100 contains a pellet mill 102 with an inner cylindrical pellet die 104. The PVA/ZTC mixture 106 was loaded into the pellet die 104. The pellet mill 102 was fitted with a heating jacket 108 to heat the die to specific temperature at particular ramp rates (for example, heating to 473 K at a ramp rate of 10 K/min). While heating, samples can be pressured under conditions ranging from 100 to 350 MPa and kept for 30 minutes at the target temperature. Two specific pelletizing pressures were used-150 MPa and 300 MPa—for production of pelletized ZTC compositions that were further characterized in the examples. Compression forces were applied using a shaft 110 that presses down on the PVA/ZTC mixture. In certain examples, the ZTC pellets 112, thus produced, have a cylinder shape with following dimensions: 13.2 millimeter (mm) in diameter and 5.9 mm in height. The final shape of ZTC pellets depends on the shape of die.

Embodiments include pelletized zeolite-templated carbon compositions with appropriate density and mechanical strength for natural gas storage. These pelletized ZTC compositions have greater bulk density and mechanical strength for natural gas storage than the ZTC powder compositions.

In certain embodiments, the bulk density of the pelletized ZTC compositions ranges from 0.6 gcm$^{-3}$ to 1.5 gcm$^{-3}$. In certain embodiments, the bulk density of the pelletized zeolite-templated carbon composition ranges from 0.8 gcm$^{-3}$ to 1.0 gcm$^{-3}$. In certain embodiments, the volumetric methane adsorption capacity of the pelletized zeolite-templated carbon composition for methane, as measured at a temperature of 298K and a pressure of 40 bars, ranges from 120 v/v to 200 v/v. In certain embodiments, the pelletized zeolite-templated carbon composition has a mechanical strength of 10 to 60 MPa. The pelletized zeolite-templated carbon composition is well-suited for packed-bed gas adsorption processes. In certain embodiments, the pelletized zeolite-templated carbon compositions have a mechanical strength ranging from 15 to 50 MPa. For example, a pelletized ZTC composition had a bulk density of 0.90 gcm$^{-3}$ as compared to the ZTC powder with a bulk density of 0.44 gcm$^{-3}$. In another example, the volumetric methane adsorption capacity for methane measured at 298K increased from 98 v/v for the ZTC powder to 151 v/v for the pelletized ZTC composition prepared at 473 K and 300 MPa.

Disclosed here are methods of storing a gas using an adsorbent composition containing pelletized zeolite-templated carbon. In one such method, polyvinyl alcohol-bonded pellets of zeolite templated carbon compositions are loaded in a closed chamber, and the gas to be adsorbed is introduced under pressure greater than ambient pressure to the closed chamber. The gas is supplied to and maintained in the closed chamber under loading conditions until volume of the gas adsorbed is 110 times greater than volume of gas adsorbed at ambient pressure. In certain embodiments, the step of maintaining the gas in a closed chamber under loading conditions continues until volume of the gas adsorbed is 120 times greater than volume of gas adsorbed at ambient pressure. In certain embodiments, the step of maintaining the gas in a closed chamber under loading conditions continues until volume of the gas adsorbed is 130 times greater than volume of gas adsorbed at ambient pressure. Examples of gases that can be stored using these adsorbent compositions are hydrogen, nitrogen, carbon dioxide, methane, or natural gas. In an embodiment, the adsorbent composition is polyvinyl alcohol-bonded pellets of zeolite templated carbon with a pellet density greater than 0.6 gcm$^{-3}$ and mechanical compressive strength greater than 10 MPa. In an embodiment, the adsorbent composition is polyvinyl alcohol-bonded pellets of zeolite templated carbon with a pellet density greater than 0.8 gcm$^{-3}$ and mechanical compressive strength greater than 30 MPa.

EXAMPLES

Example 1

A PVA formulation from Sigma-Aldrich, which has a molecular weight distribution of 85,000-124,000 g/mol and is 99% hydrolyzed, was used as the binder. This PVA was first dissolved in distilled water at a mass ratio of H$_2$O:PVA at 20:1. The aqueous solution of PVA was mixed with pre-weighed ZTC to form a viscous slurry. The ZTC slurry contained 5 wt % of the PVA solution and 10 wt % of ZTC. The ZTC slurry was placed inside an oven at a temperature ranging from 373 to 393 K and under vacuum conditions. The water evaporated from the ZTC slurry to form a PVA/ZTC powder. The resulting PVA/ZTC powder was pressed under heat and pressure. One sample was subjected to 150 MPa of pressure and a heating rate of 10 K/min to reach 473 K for 30 minutes. Another sample was subjected to 300 MPa of pressure and a heating rate of 10 K/min to reach 473 K for 30 minutes. Similarly, samples were prepared with various amounts of PVA concentrations and subjected to different temperatures and pressures during pelletization. The pelletized samples were denoted as 'ZTC-x wt-y K-z MPa', where x is wt % of PVA, y is the heating temperature, and z is the pelletizing pressure. For example, ZTC-5 wt-473K-150 MPa indicates that this sample was prepared from a ZTC slurry containing 5 wt % PVA. This ZTC slurry was then dried to produce the PVA/ZTC mixture, which was subsequently pelletized at 150 MPa and 473 K.

Example 2

Pore size distribution is an important characteristic for evaluating materials suitable for gas storage applications. The pore size distribution of the pelletized ZTC compositions was analyzed. One of the prevalent methods for determining microscopic pore size distribution is using indirect molecular adsorption methods such as nonlocal density functional theory (NLDFT) algorithms and nitrogen isotherms at 77 K.

Figure 2:
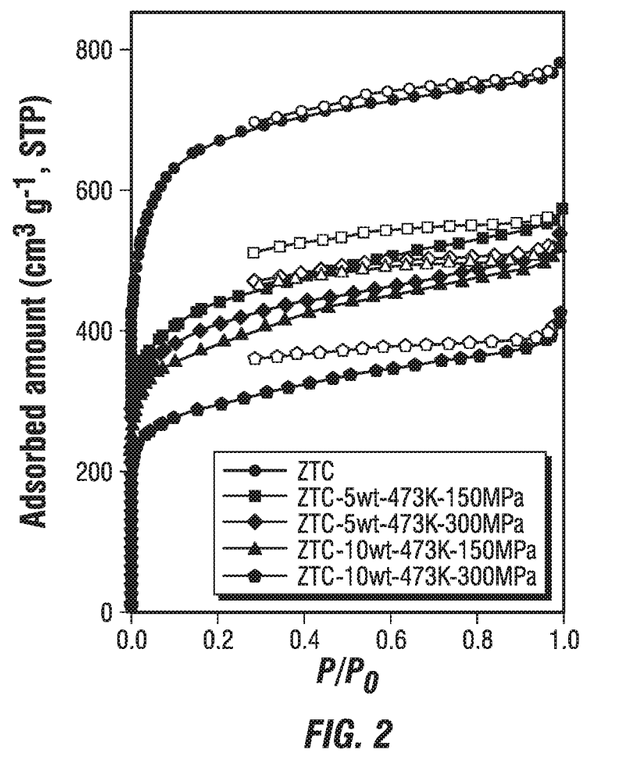
FIG. 2 is a graphical representation of the nitrogen adsorption-desorption isotherms of zeolite-templated carbon compositions that were prepared at different polyvinyl alcohol (PVA) loading concentrations and pelletizing pressures, as compared to the zeolite-templated carbon (ZTC) powder without pelletization, according to an embodiment.

A nitrogen adsorption-desorption isotherm is a plot of the relative pressure from 0 to 1 and back against the adsorbed volume obtained by measuring the amount of nitrogen that adsorbs onto the surface of interest, and the subsequent amount that desorbs at a constant temperature. FIG. 2 is a graphical representation of the nitrogen adsorption-desorption isotherms of pelletized ZTC compositions prepared at different PVA loading concentrations and pelletizing pressures as compared to the ZTC powder without pelletization. The nitrogen adsorption-desorption isotherms, thus obtained, demonstrate that pore volume and surface area of the carbon samples decreased, as PVA loading and pelletizing pressure increased.

The pore size distribution of all samples were calculated by NLDFT algorithms. FIG. 3 is a graphical representation of pore size distribution of ZTC compositions prepared at different PVA loading concentrations and pelletizing pressures as compared to the ZTC powder without pelletization. Pelletizing the ZTC compositions at increasing pressures led to the production of compositions with narrow pore size distributions, while changes in the amount of PVA had little to no effect on the pore size distribution. The various pore size distribution curves are offset only for purposes of clarity.

Table 1 presents the specific surface area (SBET) as determined by BET analysis that relates to the total surface area (expressed as square meters per gram (m$^2$ gm$^{-1}$)) as all porous structures that adsorb gas molecules. For example, ZTC-10 wt-473K-150 MPa and ZTC-10 wt-473K-300 MPa pellets showed decreased surface area (Table 1), compared with the ZTC-5 wt-473K-150 MPa and ZTC-5 wt-473K-300 MPa pellets. This decrease in SBET can be explained by decreases in the weight fraction of carbon as the PVA loading increases. Moreover, a fraction of PVA can block the pores of the carbon framework. At both the 5 wt % and 10 wt % loadings, PVA/ZTC pellets prepared at 300 MPa had decreased porosity than those prepared at 150 MPa, partially because ZTC structures may be partly damaged or more PVA binders intrude into the carbon pores at increased external pressure. Pellet densities depended on the pelletizing pressure. For example, pellets which were pressed under 300 MPa (ZTC-5 wt-473K-300 MPa and ZTC-10 wt-473K-300 MPa) had increased density (0.90 and 0.93 gcm$^{-3}$) than those prepared at 150 MPa (ZTC-5 wt-473K-150 MPa and ZTC-10 wt-473K-150 MPa) with a density of 0.64 and 0.66 gcm$^{-3}$ respectively. Although there were decreases in porosity, the pelletized ZTCs showed very similar micropore size distributions centered at 1.4 nm as in the case of ZTC powder sample (FIG. 3). But, pore size distributions of the ZTC pellets prepared at 300 MPa (ZTC-5 wt-473K-300 MPa or ZTC-10 wt-473K-300 MPa) are narrower than those prepared at 150 MPa. Table 1 also provides the micropore and mesopore volumes as calculated by Dubinin-Radushkevich equations.

TABLE 1

| Sample | $S_{BET}$ (m$^2$ g$^{-1}$) | $V_{micropore}$ (cm$^3$ g$^{-1}$) | $V_{mesopore}$ (cm$^3$ g$^{-1}$) | $V_{total}$ (cm$^3$ g$^{-1}$) | Pellet density (gcm$^{-3}$) |
|---|---|---|---|---|---|
| ZTC (powder) | 2531 | 1.01 | 0.19 | 1.20 | 0.44 |
| ZTC-5 wt-473K-150 MPa | 1621 | 0.66 | 0.22 | 0.88 | 0.64 |
| ZTC-5 wt-473K-300 MPa | 1505 | 0.61 | 0.21 | 0.82 | 0.90 |
| ZTC-10 wt-473K-150 MPa | 1411 | 0.57 | 0.23 | 0.80 | 0.66 |
| ZTC-10 wt-473K-300 MPa | 1079 | 0.44 | 0.21 | 0.65 | 0.93 |

Example 3

Figure 4:
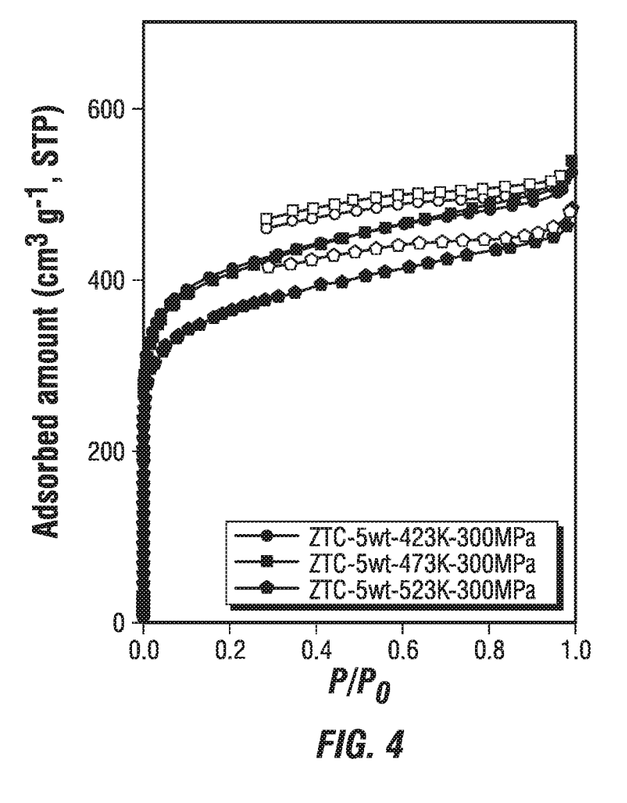
FIG. 4 is a graphical representation of the nitrogen adsorption-desorption isotherms of the pelletized zeolite-templated carbon compositions, prepared at different temperatures at the same PVA loading concentration and pelletizing pressure, according to an embodiment.

The pore size distribution of the pelletized ZTC compositions prepared at different temperatures and pressures was evaluated. FIG. 4 is a graphical representation of the nitrogen adsorption-desorption isotherms of the pelletized ZTC compositions, prepared at different temperatures at the same PVA loading concentration and pelletizing pressure. The nitrogen adsorption-desorption isotherms demonstrate that pore volume and surface area of the carbon samples decreased, as temperature increased. As shown in Table 2, pellet density reached maximum value of 0.90 gcm$^{-3}$ at 473 K and did not increase further even if the temperature was increased to 523 K. However, when the PVA/ZTC compositions were pelletized at 523 K, micropore volume and BET surface area of the compositions decreased as compared to the micropore volume and BET surface area of the composition pelletized at 473 K. This may be due to the intrusion of melted PVA into the micropores of carbon materials. Therefore, compacting by hot pressing at temperatures around 473 K appears to be an optimum condition in this embodiment for simultaneously achieving increased microporosity as well as increased pellet density.

TABLE 2

| Sample | $S_{BET}$ (m$^2$ g$^{-1}$) | $V_{micropore}$ (cm$^3$ g$^{-1}$) | $V_{mesopore}$ (cm$^3$ g$^{-1}$) | $V_{total}$ (cm$^3$ g$^{-1}$) | Pellet density (gcm$^{-3}$) |
|---|---|---|---|---|---|
| ZTC (powder) | 2531 | 1.01 | 0.19 | 1.20 | 0.44 |
| ZTC-5 wt-423K-300 MPa | 1537 | 0.62 | 0.19 | 0.81 | 0.80 |
| ZTC-5 wt-473K-300 MPa | 1505 | 0.61 | 0.21 | 0.82 | 0.90 |
| ZTC-5 wt-523K-300 MPa | 1332 | 0.55 | 0.19 | 0.74 | 0.90 |

Figure 5:
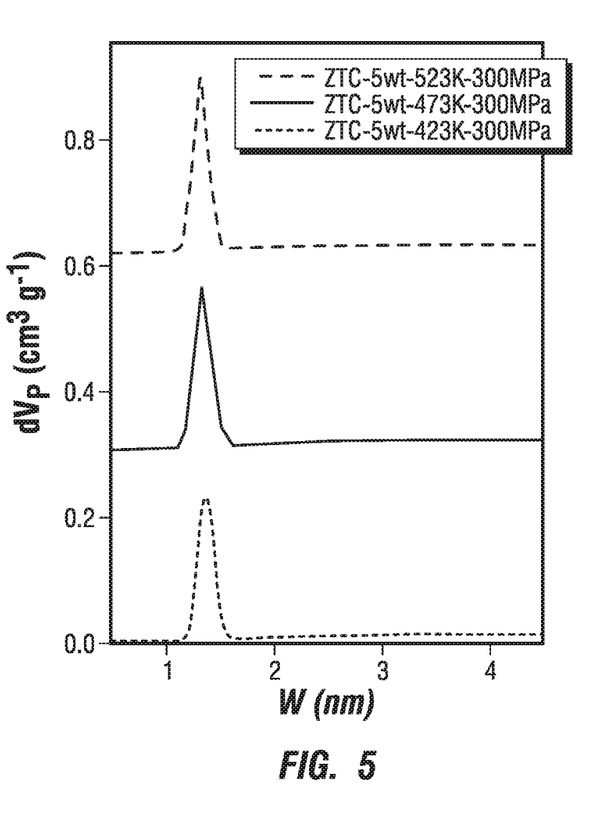
FIG. 5 is a graphical representation of pore size distribution of the pelletized zeolite-templated carbon compositions, prepared at different temperatures at the same PVA loading concentration and pelletizing pressure, according to an embodiment.

The pore size distribution of all of the pelletized ZTC compositions, prepared at different temperatures but at the same PVA loading concentration and pelletizing pressure, were calculated by NLDFT algorithms. FIG. 5 is a graphical representation of pore size distribution of the pelletized ZTC compositions, prepared at different temperatures at the same PVA loading concentration and pelletizing pressure. Pelletizing the zeolite-templated carbon compositions at increasing temperatures resulted in no substantial changes in the pore size distribution. The various pore size distribution curves are offset only for purposes of clarity.

Example 4

Figure 6:
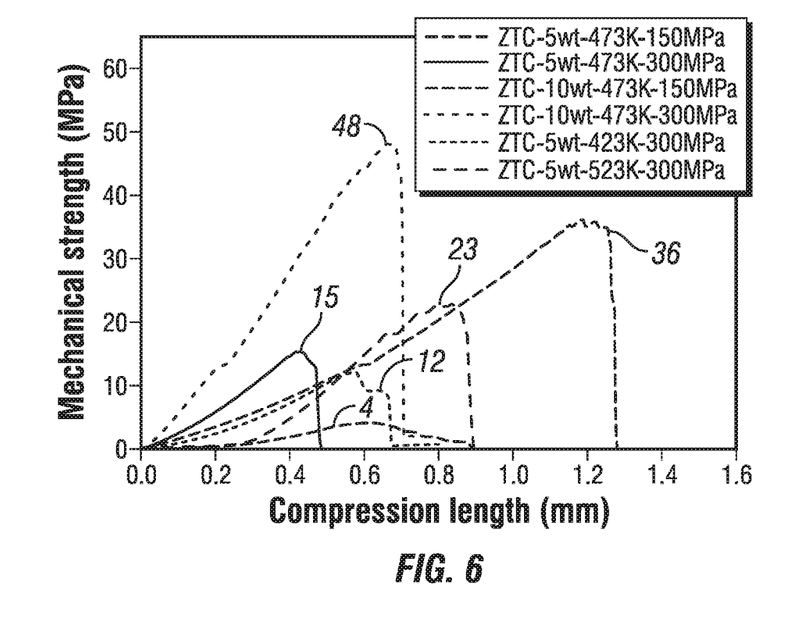
FIG. 6 is a graphical representation of the mechanical strength analysis of the pelletized zeolite-templated carbon compositions, prepared at different temperatures, PVA loading concentrations, and pelletizing pressures, according to an embodiment.

Mechanical strength of the pellets is another important factor required for practical applications and it was measured with INSTRON® 5583, a static tensile strength testing machine (available from Instron Corporation, Norwood, Mass., USA). Each pelletized zeolite-templated carbon composition was loaded at the machine and compressed at a compression rate of 1.0 mm per minute until the pellet broke. FIG. 6 is a graphical representation of the mechanical strength analysis of the pelletized zeolite-templated carbon compositions, prepared at different temperatures, PVA loading concentrations, and pelletizing pressures. The pelletized ZTC compositions with 10 wt % PVA showed very strong mechanical strength (>30 MPa). Other carbon pellets with 5 wt % PVA exhibited moderate strength around 15 MPa when they are pelletized at 300 MPa. The ZTC-5 wt-473K-150 MPa composition that was prepared with decreased loading of PVA and under lesser pressure had poor mechanical strength (4.0 MPa) as compared to the other samples. All the carbon pellets except this ZTC-5 wt-473K-150 MPa sample exhibited sufficient mechanical strength of greater than 10 MPa for gas storage applications.

Example 5

Figure 7:
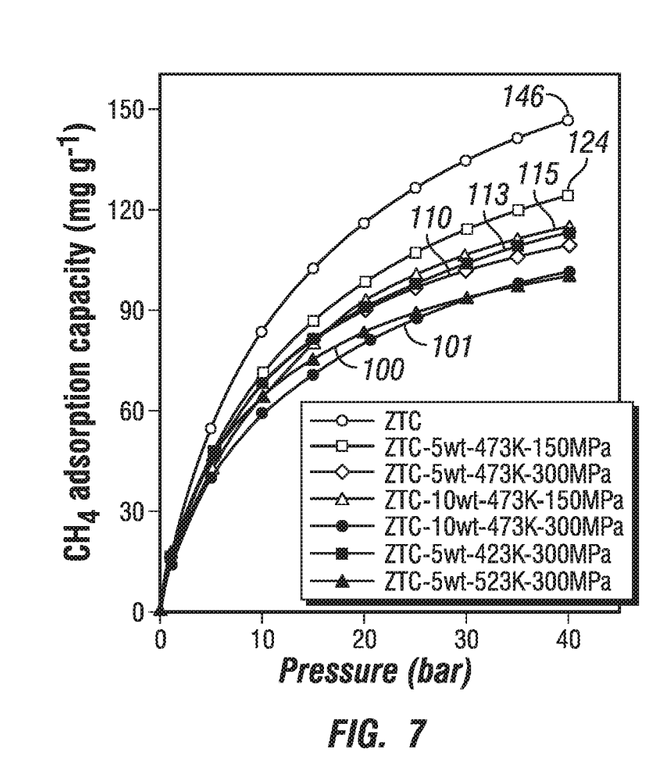
FIG. 7 is a graphical representation of the methane adsorption isotherm of the pelletized zeolite-templated carbon compositions, prepared at different temperatures, PVA loading concentrations, and pelletizing pressures, and obtained using a gravimetric apparatus, according to an embodiment.

The high-pressure methane adsorption isotherms were used to compare the gravimetric and volumetric capacities of the pelletized zeolite-templated carbon compositions. The evaluation pressure ranged from about 0 to about 40 bar. The evaluation temperature was maintained at 298 K. FIG. 7 is a graphical representation of the high-pressure methane adsorption isotherm at 298 K of the pelletized zeolite-templated carbon compositions, which were prepared at different temperatures, PVA loading concentrations, and pelletizing pressures, and obtained using a gravimetric apparatus. The value provided at the end of each isotherm trace is the stored methane value on a gravimetric basis. The methane uptake of all pelletized ZTC compositions decreased compared with the ZTC powder, because the micropore volume of the ZTC pellets (0.44-0.66 cm$^3$g$^{-1}$) decreased as compared to the micropore volume of the ZTC powder (1.01 cm$^3$g$^{-1}$). The methane adsorption capacity in gravimetric basis (measured as the stored methane value) of the pelletized ZTC compositions did not decrease correspondingly after pelletization (100-124 milligram per gram (mg g$^{-1}$)) as compared to value for the ZTC powder (146 mg g$^{-1}$), despite the drastic decreases in micropore volume. Consequently, the methane adsorption density (determined by amount of methane adsorption per unit micropore volume) increased after pelletization of the zeolite-templated carbon compositions. The increased methane adsorption density means that carbon micropores are more effectively used for methane adsorption and this can be attributed to narrower and also sharper size distribution of carbon micropores after pelletization of the zeolite-templated carbon compositions.

Figure 8:
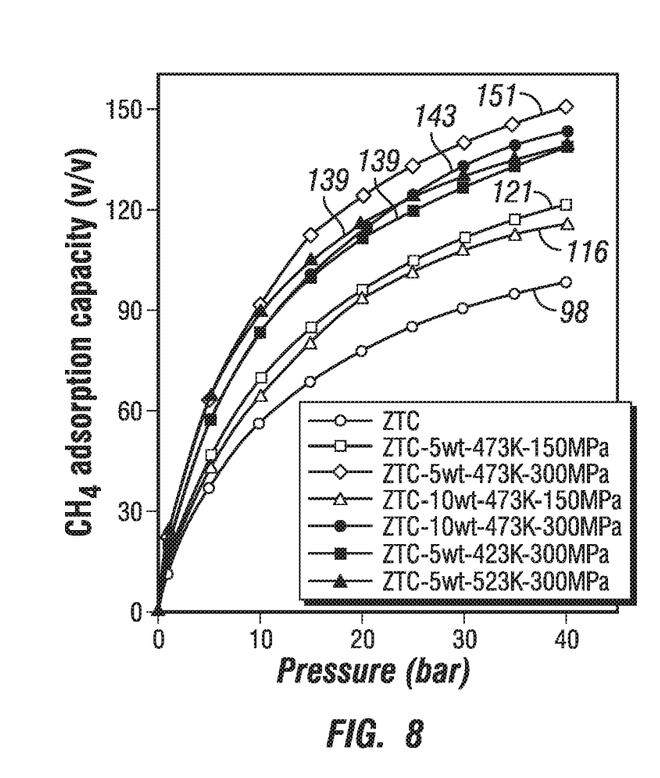
FIG. 8 is a graphical representation of the methane adsorption isotherm of the pelletized zeolite-templated carbon compositions, prepared at different temperatures, PVA loading concentrations, and pelletizing pressures, and obtained using a volumetric apparatus, according to an embodiment.

FIG. 8 is a graphical representation of the methane adsorption isotherm at 298 K of the pelletized zeolite-templated carbon compositions, prepared at different temperatures, PVA loading concentrations, and pelletizing pressures, and obtained using a volumetric apparatus. The delivered methane amount derived from the volumetric methane adsorption amount for a particular composition represents the amount of methane that is adsorbed and released between cycles of 1 bar and 40 bar, and is determined by subtracting the adsorption amount detected at 1 bar from the adsorption amount detected at 40 bar. As shown in Table 3, the methane adsorption capacity in volumetric basis increased although the gravimetric methane adsorption capacity decreased after pelletization of the zeolite-templated carbon compositions. This can be attributed to the increase in the pellet density and methane adsorption density (methane uptake divided by carbon micropore volume) in the carbon micropores. On volumetric basis (FIG. 8), ZTC-5 wt-473K-300 MPa exhibited the greatest methane adsorption capacity (151 v/v) and methane delivery (123 v/v) among the various ZTC samples.

Table 3 provides a summary of the adsorption capacity of pellets in both gravimetric and volumetric basis, along with the pellet density of the pelletized zeolite-templated carbon compositions, prepared at different temperatures, PVA loading concentrations, and pelletizing pressures.

property, and all combinations of ranges formed from all stated quantitative values of a given property are contemplated in this disclosure. Having described the subject matter of the present disclosure in detail and by reference to specific embodiments, it is noted that the various details described in this disclosure should not be taken to imply that these details relate to elements that are essential components of the various embodiments described in this disclosure, even in cases where a particular element is illustrated in each of the drawings that accompany the present description. Further, it will be apparent that modifications and variations are possible without departing from the scope of the appended claims.

What is claimed is:

1. A method of producing an adsorbent composition, the method comprising the steps of:
    forming an aqueous mixture containing a binder, water, and a zeolite-templated carbon;
    subjecting the aqueous mixture to a drying process to remove the water and form a dry mixture of the binder and the zeolite-templated carbon, and
    compacting the dry mixture of the binder and the zeolite-templated carbon to form an adsorbent composition, wherein the adsorbent composition is a binder-bonded pellet of the zeolite templated carbon and wherein the step of compacting the dry mixture of the binder and the zeolite-templated carbon is performed at a temperature ranging from about 423 to 523 Kelvin to simultaneously increase microporosity and pellet density of the binder-bonded pellet.

2. The method of claim 1, wherein the binder comprises polyvinyl alcohol.

3. The method of claim 2, wherein the polyvinyl alcohol has a molecular weight ranging from 85,000 to 124,000 grams per mole and is 99% hydrolyzed.

4. The method of claim 1, wherein the binder is present at between about 5 weight percent of the aqueous mixture and about 10 weight percent of the aqueous mixture, and the zeolite-templated carbon is present at between about 5 weight percent of the aqueous mixture and about 15 weight percent of the aqueous mixture.

5. The method of claim 1, wherein the step of subjecting the aqueous mixture to a drying process is performed at a temperature ranging from about 373 to 393 Kelvin.

TABLE 3

| Sample | $S_{BET}$ (m$^2$g$^{-1}$) | $V_{micropore}$ (cm$^3$g$^{-1}$) | $V_{total}$ (cm$^3$g$^{-1}$) | Pellet density (gcm$^{-3}$) | CH$_4$ stored (mg/g) | CH$_4$ density (gcm$^{-3}$) | CH$_4$ stored (v/v) | CH$_4$ delivery (v/v) |
|---|---|---|---|---|---|---|---|---|
| ZTC powder | 2531 | 1.01 | 1.20 | 0.44 | 146 | 0.14 | 98 | 84 |
| ZTC-5 wt-473K-150 MPa | 1621 | 0.66 | 0.88 | 0.64 | 124 | 0.19 | 121 | 101 |
| ZTC-5 wt-473K-300 MPa | 1505 | 0.61 | 0.82 | 0.90 | 110 | 0.18 | 151 | 123 |
| ZTC-10 wt-473K-150 MPa | 1411 | 0.57 | 0.80 | 0.66 | 115 | 0.20 | 116 | 100 |
| ZTC-10 wt-473K-300 MPa | 1079 | 0.44 | 0.65 | 0.93 | 101 | 0.23 | 143 | 120 |
| ZTC-5 wt-423K-300 MPa | 1537 | 0.62 | 0.81 | 0.80 | 113 | 0.18 | 139 | 113 |
| ZTC-5 wt-523K-300 MPa | 1332 | 0.55 | 0.74 | 0.90 | 100 | 0.18 | 139 | 111 |

The BET specific surface area and the micropore volume dictate methane adsorption capacity for a given adsorbent. However, the methane adsorption capacity is also affected by pore size distribution, mesopore volume, and packing density of the adsorbents.

It should be understood that any two quantitative values assigned to a property may constitute a range of that 6. The method of claim 1, wherein the step of compacting the dry mixture of the binder and the zeolite-templated carbon is performed at a pressure ranging from about 100 to 350 megapascals.

7. The method of claim 1, wherein the step of compacting the dry mixture of the binder and the zeolite-templated carbon is performed at a pressure of about 150 megapascals.

8. The method of claim 1, wherein the step of compacting the dry mixture of the binder and the zeolite-templated carbon is performed at a pressure of about 300 megapascals.

9. The method of claim 1, wherein the step of compacting the dry mixture of the binder and the zeolite-templated carbon is performed at a temperature of about 473 Kelvin.

* * * * *